United States Patent
Benning et al.

[11] Patent Number: 5,774,565
[45] Date of Patent: Jun. 30, 1998

[54] ELECTRONIC CANCELLATION OF AMBIENT NOISE IN TELEPHONE HEADSET

[75] Inventors: Roger David Benning, Long Valley; Elliot Andrew Fischer, Madison; Patricia Lee Greene, Mountain Lakes; Charles Sanford, Somerset; Robert Edward Schneider, Wayne, all of N.J.

[73] Assignee: Lucent Technologies Inc., Murray Hill, N.J.

[21] Appl. No.: 493,017

[22] Filed: Oct. 28, 1996

Related U.S. Application Data

[63] Continuation of Ser. No. 285,614, Aug. 3, 1994, abandoned, which is a continuation of Ser. No. 971,009, Nov. 2, 1992.

[51] Int. Cl.$^6$ ..................................................... H04R 27/00
[52] U.S. Cl. .............................. 381/83; 351/93; 351/71.6; 351/71.14; 351/94.2
[58] Field of Search .............................. 381/83, 93, 71.6, 381/71.14, 94.2, 72

[56] References Cited

U.S. PATENT DOCUMENTS

| | | | |
|---|---|---|---|
| 4,455,675 | 6/1984 | Bose et al. ................................. | 381/71 |
| 4,953,217 | 8/1990 | Twiney et al. ............................ | 381/71 |
| 4,985,925 | 1/1991 | Langberg et al. ........................ | 381/72 |
| 5,003,606 | 3/1991 | Bordewijk ................................ | 381/93 |
| 5,276,740 | 1/1994 | Inanaga et al. .......................... | 381/72 |

*Primary Examiner*—Forester W. Isen
*Attorney, Agent, or Firm*—Charles E. Graves; Martin I. Finston

[57] ABSTRACT

Noise reducing circuits for electronic receiving instruments, such as telephone receivers in headsets or handsets that are used in noisy locations, provide compensation of the set's receiver unit-to-error microphone transfer function to enhance the noise reduction. Further circuits provide pre-conditioning of the incoming voice signal to make the noise cancellation more effective. The tendency of these noise cancelling circuits to oscillate is substantially lessened by added circuitry which rapidly detects onset of oscillation and momentarily reduces the noise cancellation without interrupting the incoming speech path altogether.

4 Claims, 14 Drawing Sheets

FIG. 2
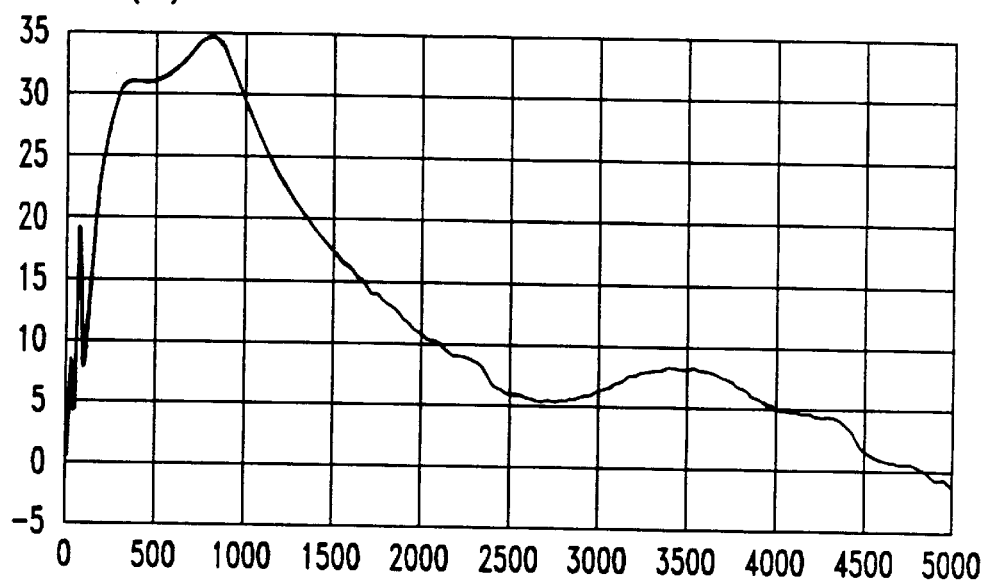
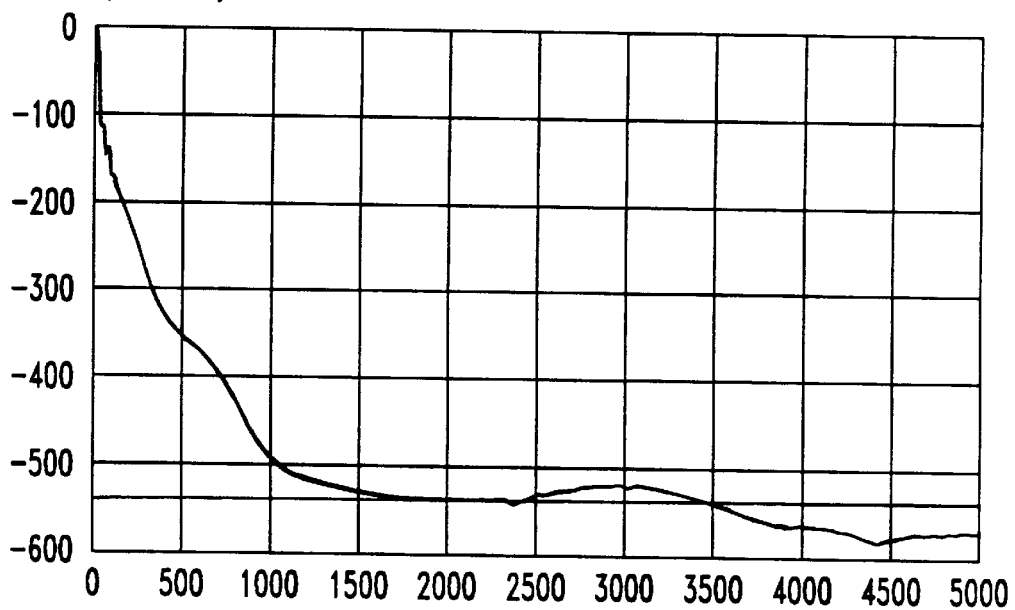

FIG. 4
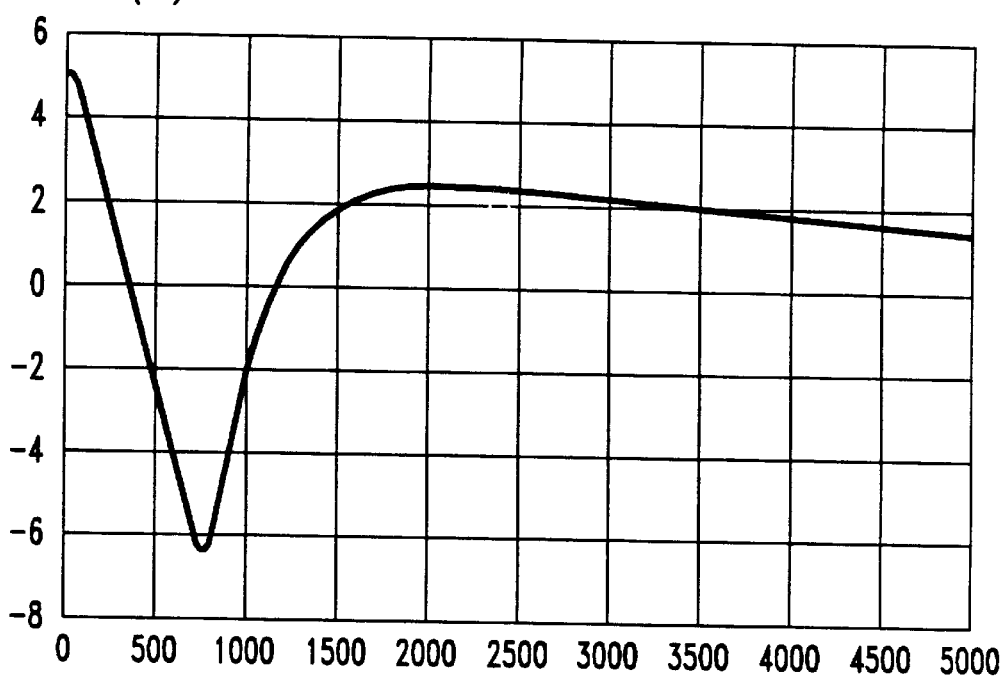
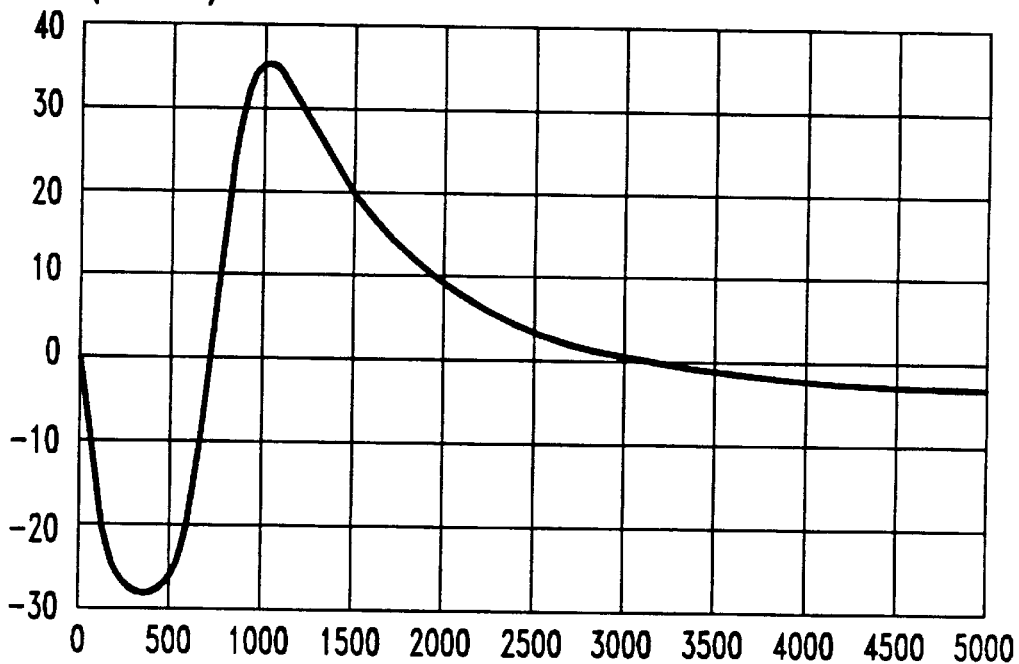

FIG. 5
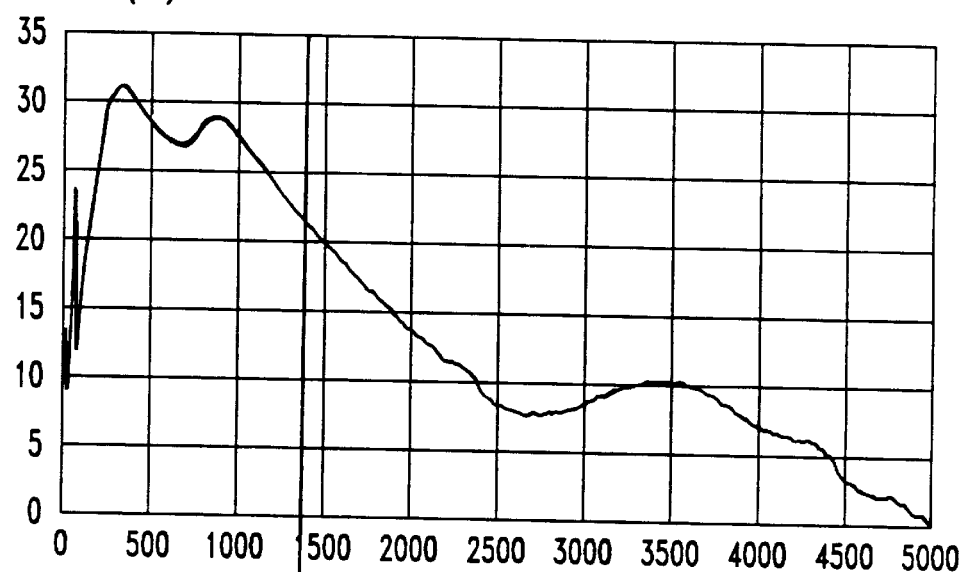
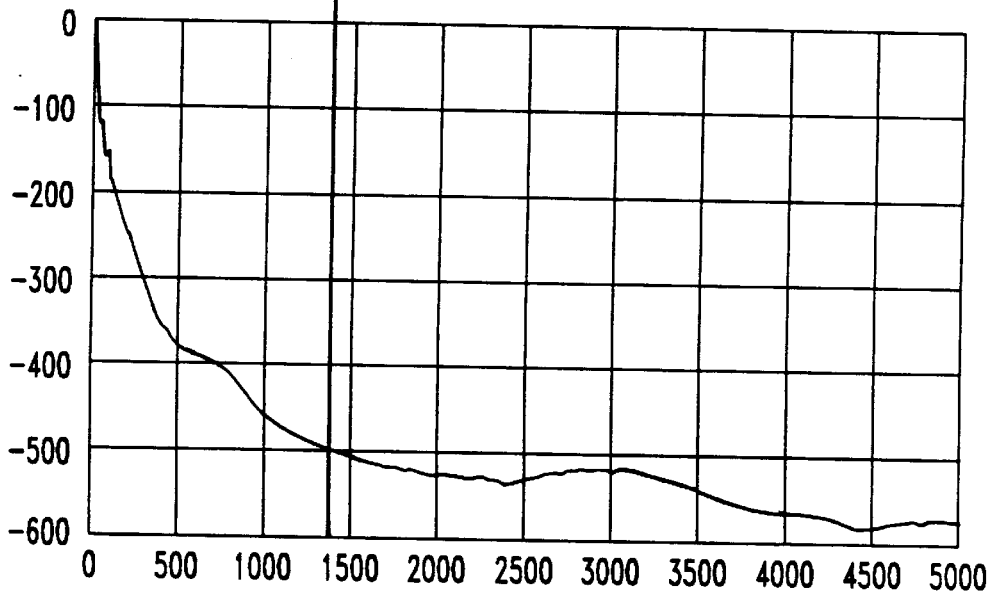

FIG. 7
SPEAKER-TO-ERROR MICROPHONE TRANSFER FUNCTION
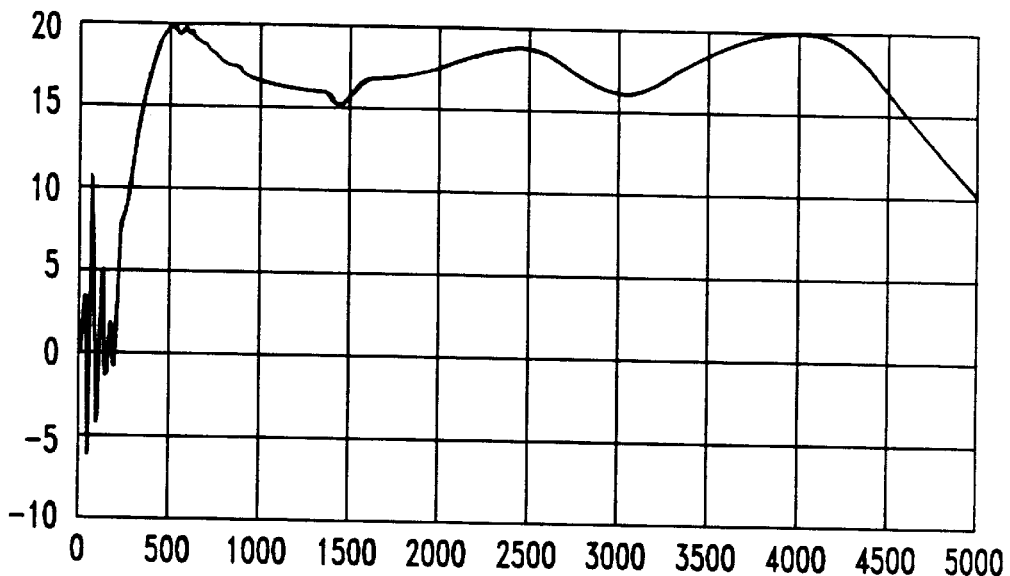
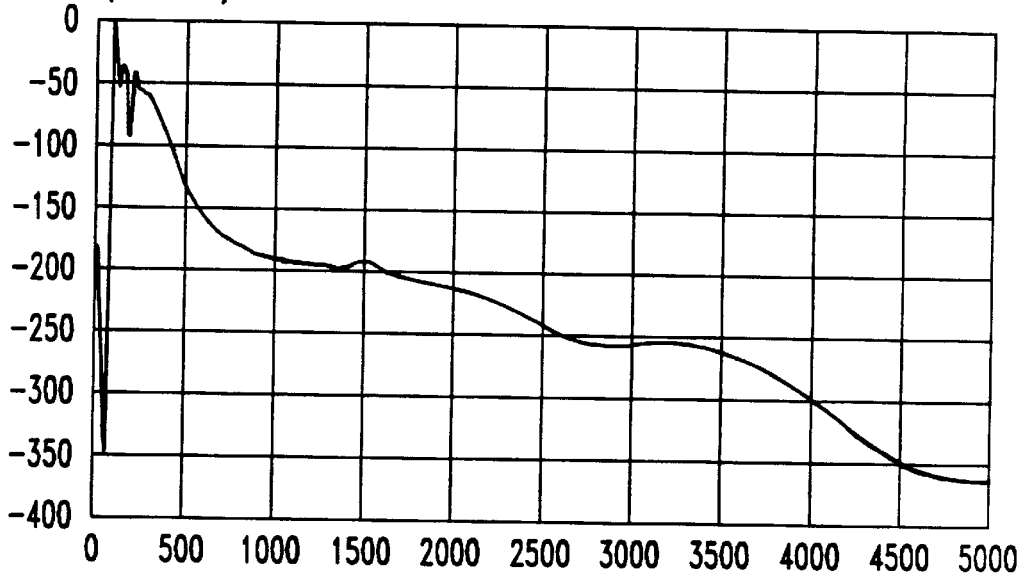

FIG. 8
COMPENSATION CIRCUIT RESPONSE - HEADSET
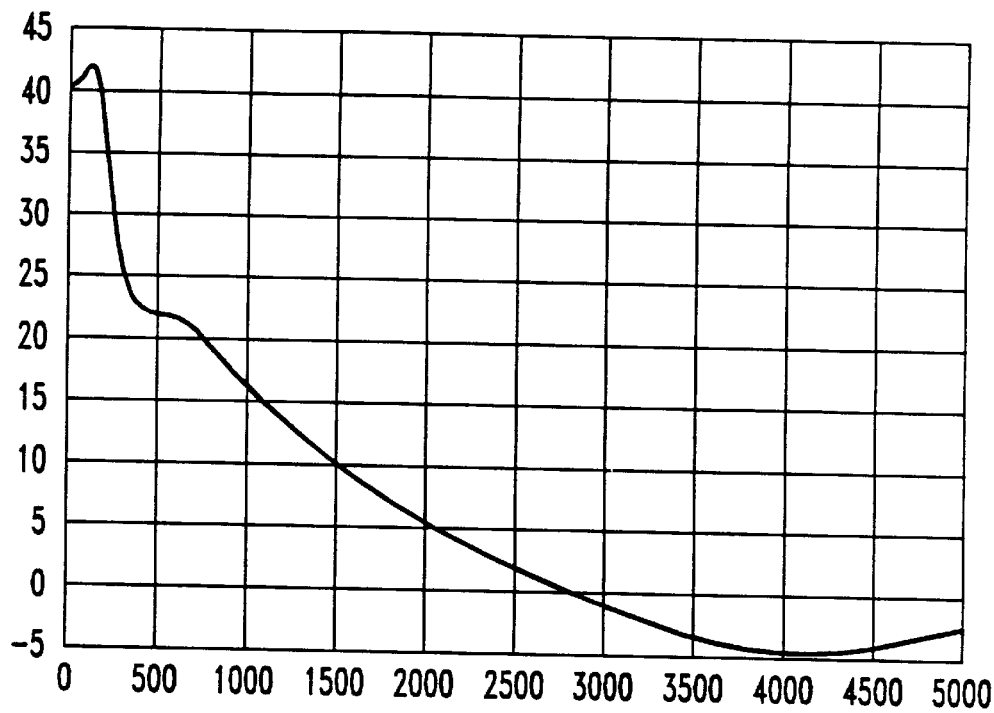
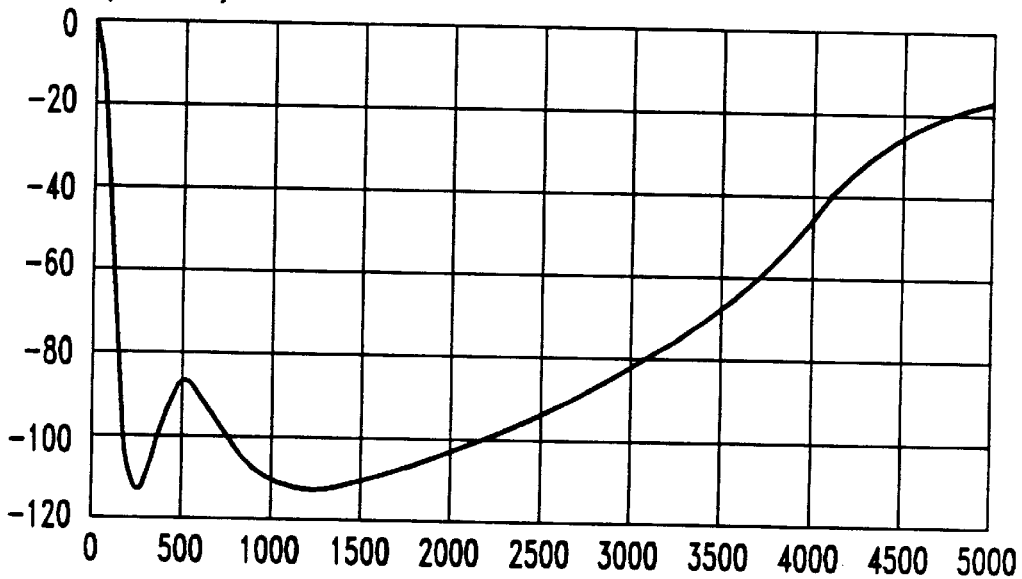

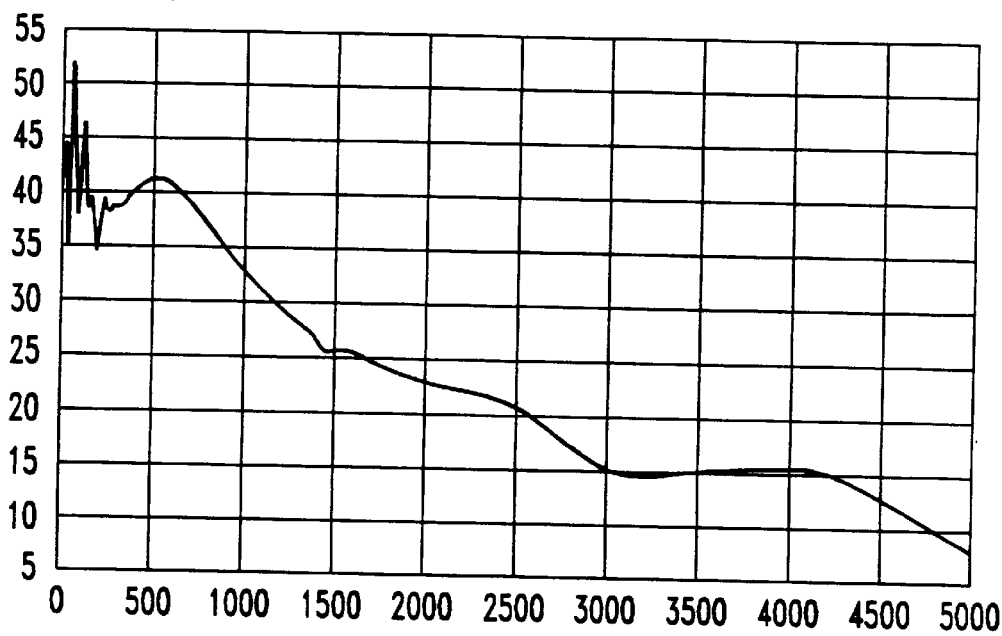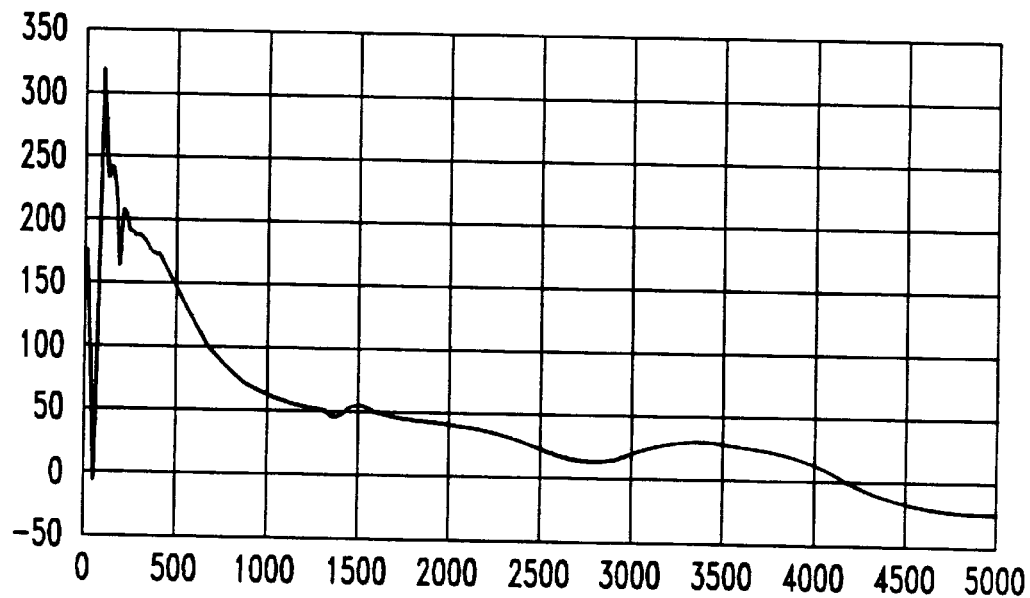
FIG. 9
HEADSET SPEAKER-TO-ERROR MICROPHONE TRANSFER FUNCTION WITH COMPENSATION

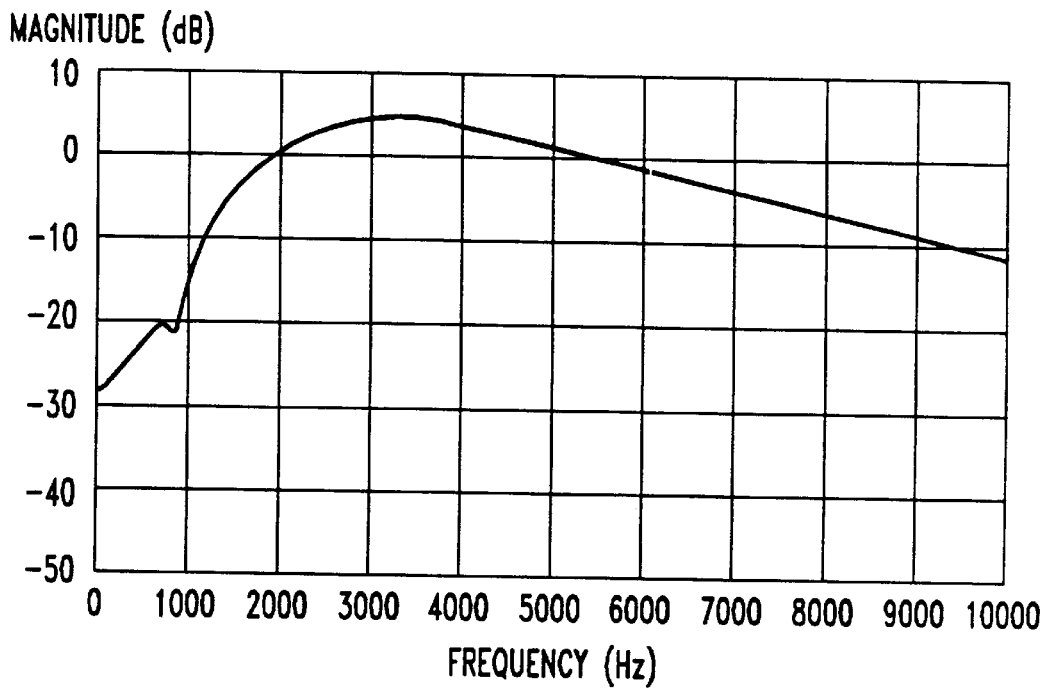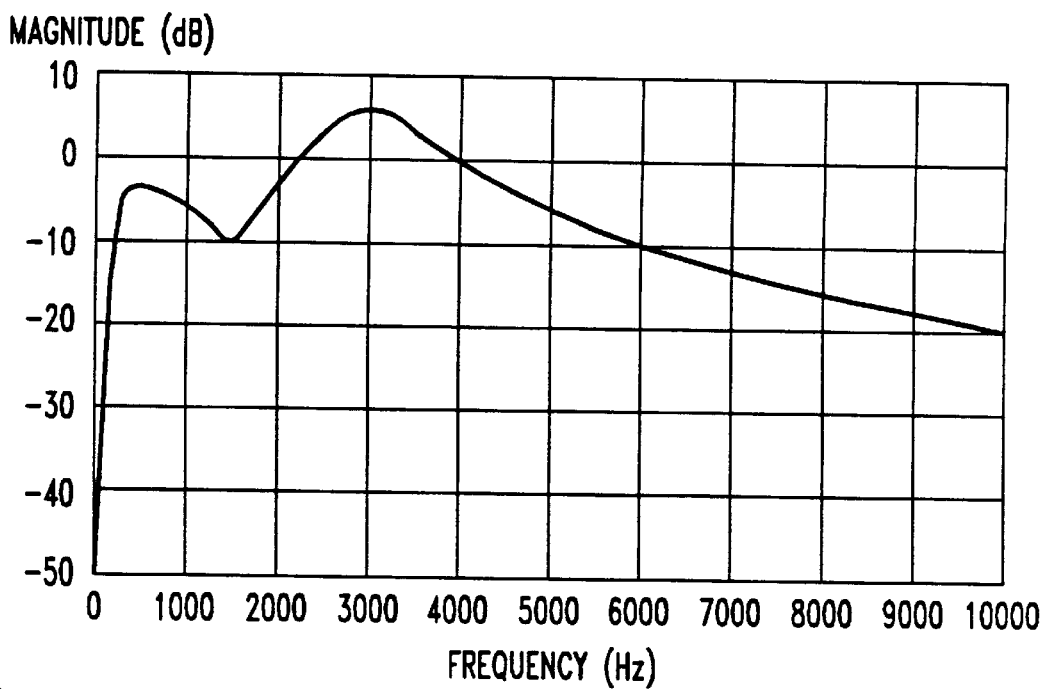
FIG. 11 — PRE-CONDITIONING CIRCUIT FREQUENCY RESPONSE HANDSET; CANCELLATION "ON"/"OFF"

HANDSET RECEIVE RESPONSE WITH PRE-CONDITIONING
—— OFF, - - - ON, HEADSET

HANDSET PRE-CONDITIONING CIRCUIT FREQUENCY RESPONSE

HEADSET RECEIVE RESPONSE WITH PRE-CONDITIONING

ELECTRONIC CANCELLATION OF AMBIENT NOISE IN TELEPHONE HEADSET

This application is a continuation division of application Ser. No. 08/285614, filed on Aug. 3, 1994, now abandoned, which is a continuation division of application Ser. No. 07/971009, filed on Nov. 2, 1992.

BACKGROUND OF THE INVENTION

Telephone receivers in headsets or handsets frequently must function in locations where the ambient noise level is high enough to substantially reduce intelligibility of the incoming signal. To overcome the ambient noise, some prior art headsets incorporate a microphone which tracks the ambient noise signal and an active circuit which uses the microphone output to generate and deliver a noise cancelling signal to the receiver.

These circuits of the prior art usually are effective in reducing undesired acoustic energy in the frequency band from about 20 Hz to 700 Hz. This range of noise cancellation is not, however, wide enough to effectively cancel higher frequency unwanted noise, which in many noisy locations is the predominant cause of the loss of intelligibility.

Further, in known noise cancelling circuits of prior art sets, the incoming speech signal typically is fed directly to the noise cancellation circuit. The direct feed design can degrade the incoming signal, however, which defeats the objective of improving the incoming speech intelligibility. Additionally, many prior art ambient noise-reducing circuits have a tendency under some conditions to oscillate, with the result that the set is momentarily disabled altogether.

SUMMARY OF THE INVENTION

The invention provides several increments of circuit design which singly and in combination improve the noise cancelling function. In accordance with one aspect of the invention, a novel compensation of the speaker-to-microphone transfer function makes possible an improvement of from 5 dB to 15 dB of noise reduction in the frequency band of 100 Hz to 1000 Hz. Further, the incoming speech signal is pre-conditioned to reduce or avoid loss of intelligibility incident to the noise cancellation processing. Additionally, oscillation tendency is overcome by providing a uniquely controlled and rapid momentary disconnection of the feedback loop gain during transient astable conditions.

The invention, its features and advantages will be apparent from a reading on the detailed description to follow of an illustrative embodiment.

BRIEF DESCRIPTION OF THE DRAWING

FIG. 2 is a graph of a particular speaker-to-error microphone transfer function;

FIG. 4 is a graph of an exemplary handset compensation circuit response;

FIG. 5 is a graph of speaker-to error microphone transfer function with compensation;

FIG. 7 is a graph illustrating headset speaker-to-error microphone transfer function;

FIG. 8 is a graph illustrating compensation circuit response for an exemplary headset;

FIG. 9 is a graph illustrating for the headset application a speaker-to-error microphone transfer function for a circuit with compensation;

FIG. 11 is a graph illustrating pre-conditioning circuit response for a handset;

DETAILED DESCRIPTION OF AN ILLUSTRATIVE EMBODIMENT

Figure 1:
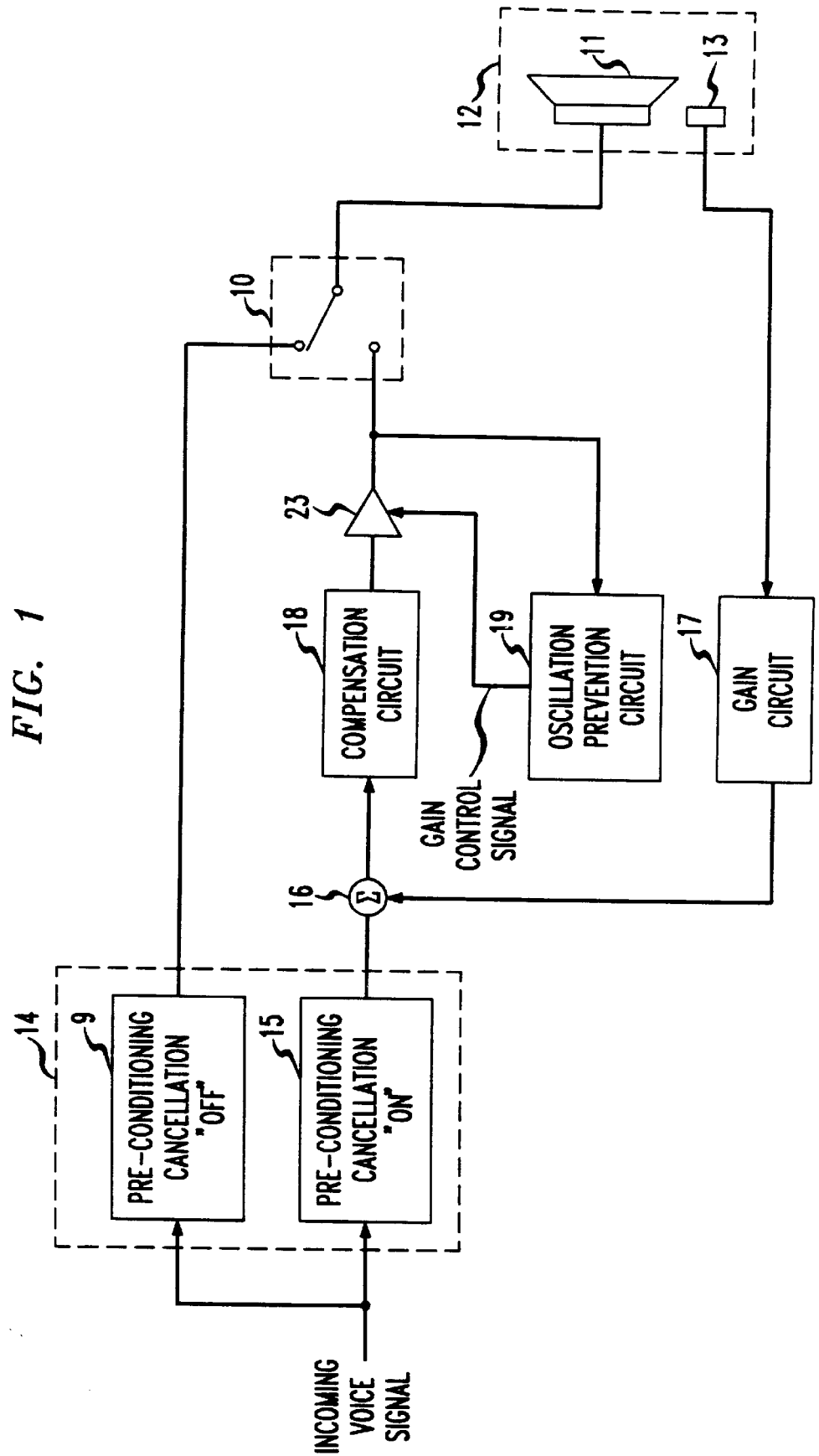
FIG. 1 is a block diagram of the overall noise cancelling circuit.

The noise cancellation circuit is shown in FIG. 1 connected to a speaker 11 of a handset or headset denoted 12 which contains an error microphone 13. Incoming voice signal from, for example, a telephone line is branched to voice pre-conditioning circuit 14 which provides a dual mode function controlled by switch 10. When the noise cancellation is "off", the incoming voice signal is passed through pre-conditioning circuit 9 to speaker 12. With noise cancellation "on", the incoming voice is pre-conditioned in circuit 15 and passed to summer 16 where it is combined with the signal from error microphone 13 routed through gain circuit 17. Output from summer 16 is fed to compensation circuit 18. Output from circuit 18 is fed through gain control 23 to speaker 11. A tap off the output of gain control 23 is connected to oscillation prevention circuit 19. Output of circuit 19 is a gain control signal to compensation circuit 18. The novel and advantageous features of the functions provided by the foregoing circuit configuration will now be discussed.

FIG. 2 shows an exemplary speaker-to-error microphone transfer function of a particular telephone handset which does not have compensation. The transfer function illustrated in FIG. 2 presents several problems which the compensation circuit of the present invention overcomes by (1) flattening the transfer function gain in the 100 Hz to 1000 Hz frequency band thereby providing a more uniform cancellation response in this frequency range; (2) by providing attenuation at frequencies above 2 kHz, thereby increasing gain margin which results in stable operation under a wide range of conditions and reducing enhancement of noise in this frequency region; and (3) by adding positive phase in the 1000 Hz to 4000 Hz frequency band, thereby increasing phase margin in this region to allow for transfer function variations due to different users. The result is stable feedback operation over the relevant cancellation bandwidth. High gain at low frequencies, attenuation at high frequencies and sufficient phase margin are combined to accommodate wide variations in the user characteristics.

Figure 3:
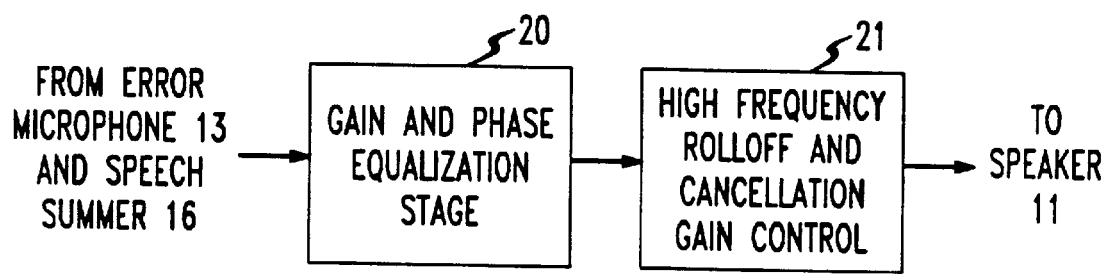
FIG. 3 is a functional descriptive diagram of the compensation circuit.

These improvements may be obtained using the circuit of FIG. 3 which shows compensation circuit 18 in further functional detail as including a gain and phase equalization stage 20 and a high frequency rolloff and cancellation gain stage 21. The compensation circuit 18 may include a second order stage for low frequency gain and high frequency rolloff practiced in the prior art. Additionally, however, stages are included to equalize the transfer function by increasing the gain at low frequencies and adding positive phase in the 1000 Hz to 4000 Hz band. This relationship is illustrated in FIG. 4.

Most troublesome ambient noise sources have predominant frequency content below 1000 Hz. These low frequency noises have a much greater effect on speech intelligibility than higher frequency noise, due to an upward frequency masking phenomenon. The cancellation of noise in the 100 Hz to 1000 Hz band in accordance with the invention, illustrated in FIG. 6, eliminates the masking effect at higher frequencies.

Noise cancellation systems of the prior art that use feedback unfortunately tend to enhance noise at frequencies above the point where cancellation reduces to 0 dB. The increased phase margin at these frequencies in accordance with the invention, as illustrated by a comparison of FIGS. 2 and 5, reduces the level of noise enhancement.

Figure 6:
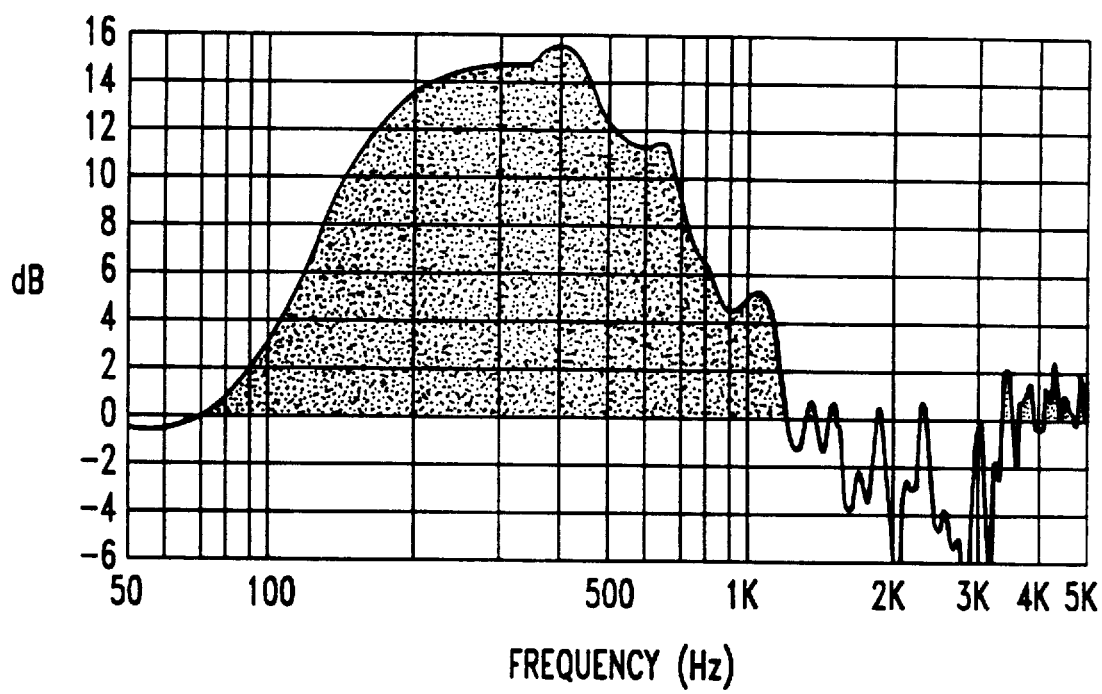
FIG. 6 is a graph of active noise cancellation performance for a particular exemplary individual.

A specific embodiment of the invention useful with telephone handsets may include a fifth order compensation circuit. By way of example, the frequency response of such a circuit is illustrated in FIG. 4. In the fifth order circuit, a third order stage may be used to equalize the transfer function and smooth the gain, and a second order stage may be used to apply low frequency gain and rolloff at high frequencies to the equalized transfer functions. The speaker-to-error transfer function with compensation is shown in FIG. 5. Comparison of FIG. 5 to the uncompensated transfer function in FIG. 2 shows that the phase in the 1000 Hz to 1500 Hz region is more positive by 30 to 40 degrees for improved phase margin. In addition, the gain at higher frequencies is relatively less with the result that at frequencies above 2000 Hz the gain is at least 10 dB less than the gain at frequencies below 1200 Hz. The gain margin therefore will be greater than 10 dB for a noise cancelling handset that provides cancellation at frequencies up to 1200 Hz. The cancellation performance for a typical handset with compensation is illustrated in FIG. 6.

A further specific embodiment of the compensation circuit useful with telephone headsets is next illustrated. An exemplary headset speaker-to-error microphone transfer function without compensation is illustrated in FIG. 7. For the case of the headset, a sixth order compensation circuit advantageously may be used. The response of this latter circuit is illustrated in FIG. 8. In the sixth order circuit, a fourth order stage may also be used to provide gain smoothing and phase advance. A second order stage may also be used to provide the high frequency rolloff. The speaker-to-error microphone transfer function with compensation is shown in FIG. 9. A comparison of the uncompensated and compensated transfer functions shows that the compensation circuit gain smoothing improves the gain below 300 Hz, thereby to increase cancellation. Further, the compensation circuit has provided high frequency rolloff and greater than 50 degrees of phase margin in the 1000 Hz to 1500 Hz region, thereby to increase stability margin.

Figure 10:
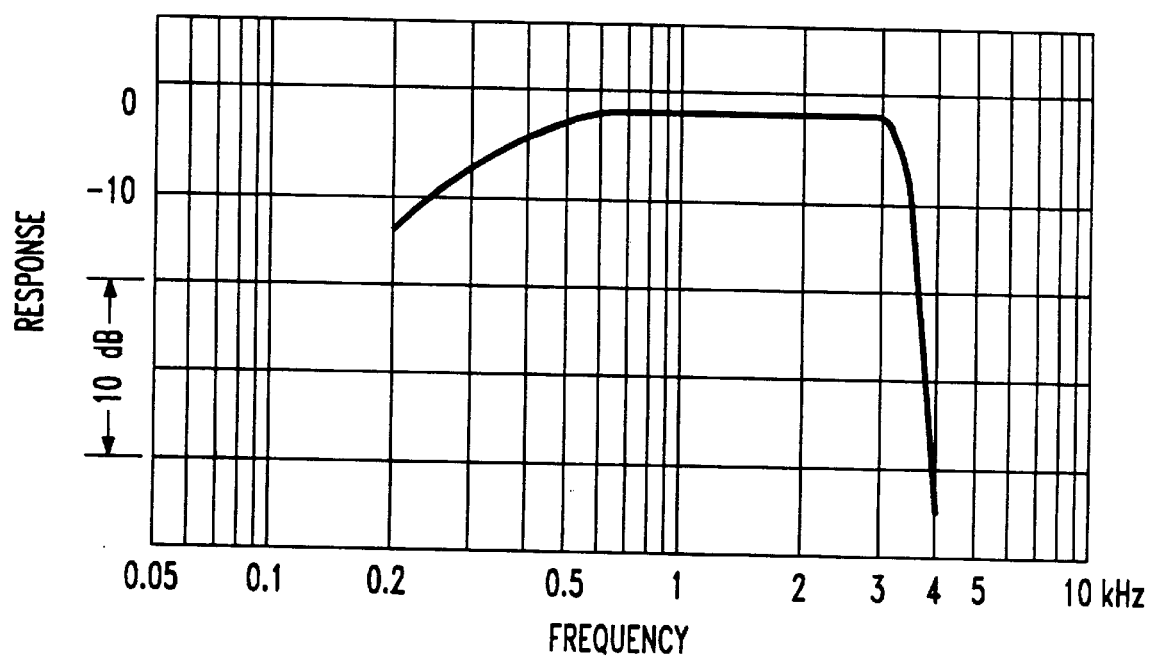
FIG. 10 is a graph showing a CCITT-recommended telephone receiver frequency response.

In accordance with a further aspect of the invention, it has been realized that voice intelligibility and quality may be improved if the incoming voice signal is pre-conditioned, or frequency shaped. Amplification of the incoming voice signal is effected over substantially the same frequency range within which the noise cancellation circuit operates. Referring again to FIG. 1, the incoming speech signal is pre-conditioned by circuit 15 when noise cancellation is active and by circuit 9 when noise cancellation is not active. This shaping is compensated by a pre-conditioning filter shown in FIG. 1. Specifically, in accordance with the invention, the pre-conditioning produces a frequency response for the voice signal that approximates the ideal telephone receiver characteristics specified by the accepted CCITT standard shown in FIG. 10.

Figure 12:
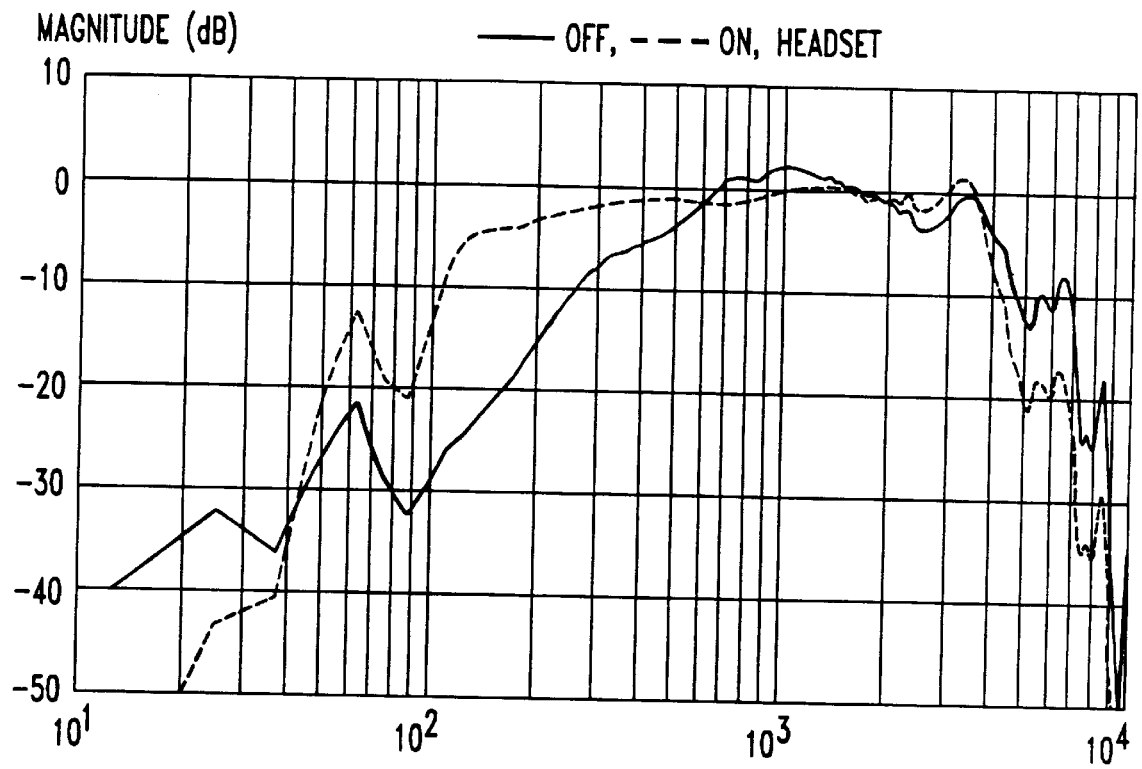
FIG. 12 is a graph showing typical handset receive response for a circuit with pre-conditioning.

The pre-conditioning responses advantageous for a noise cancellation handset are shown in FIG. 11. The transfer function from speech input to the entrance of a user's ear canal, with pre-conditioning, is shown in FIG. 12 for noise cancellation for the active and inactive cases. It is seen that both curves approximate the desired telephone receiver ideal response of FIG. 10.

Figure 13:
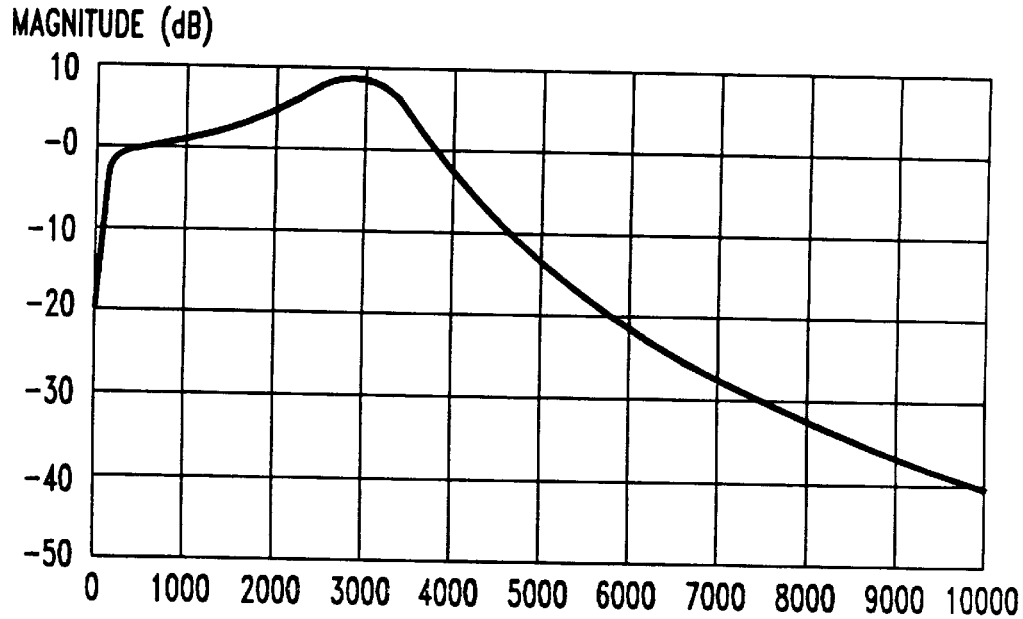
FIG. 13 is a graph illustrating pre-conditioning circuit response for a headset.
Figure 14:
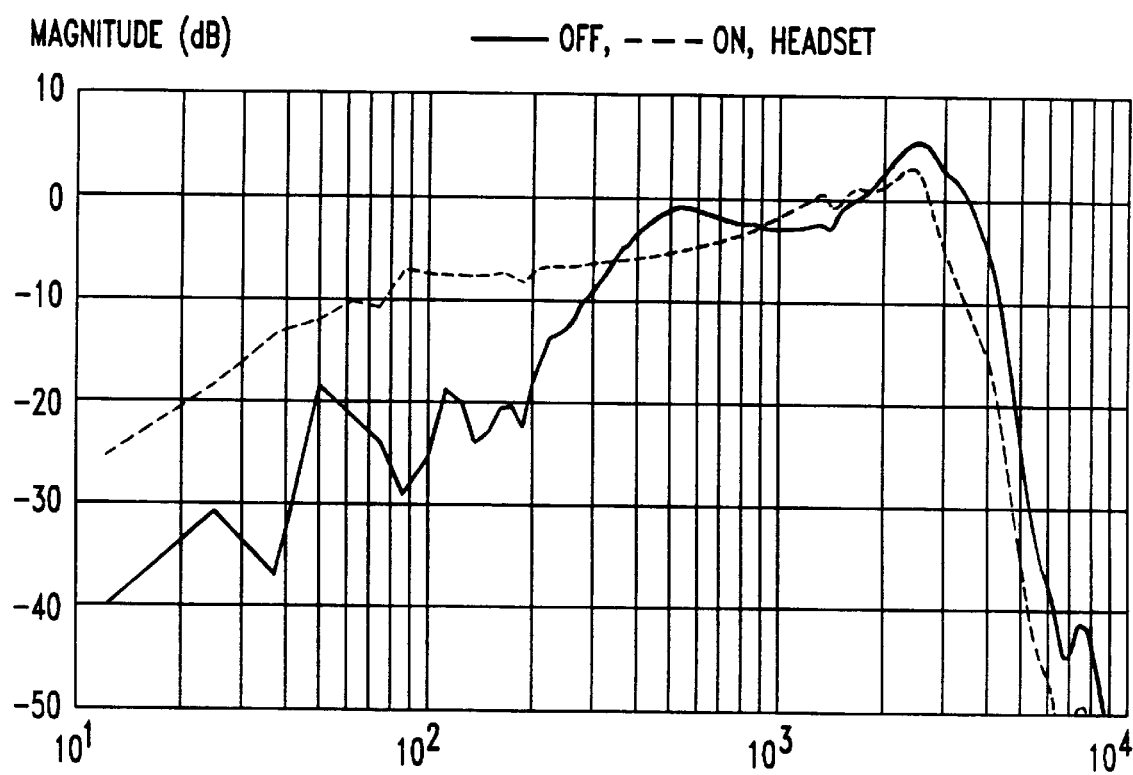
FIG. 14 is a graph showing typical headset receive response for a circuit with pre-conditioning.

The pre-conditioning responses advantageous for a noise cancellation headset are shown in FIG. 13. The transfer function from speech input to the entrance of a user's ear canal with pre-conditioning is shown in FIG. 14 for noise cancellation for the active and inactive cases. Again, both curves approximate the desired telephone receiver ideal response shown in FIG. 10.

The result is an improvement over prior art noise cancellation circuits in which the voice signal is merely added to the cancellation signal and filtered to produce a flat frequency replace. With the new method, the voice quality is improved for telephonic applications as evidenced by the closeness of the receive response to the ideal CCITT receiver characteristics.

Figure 15:
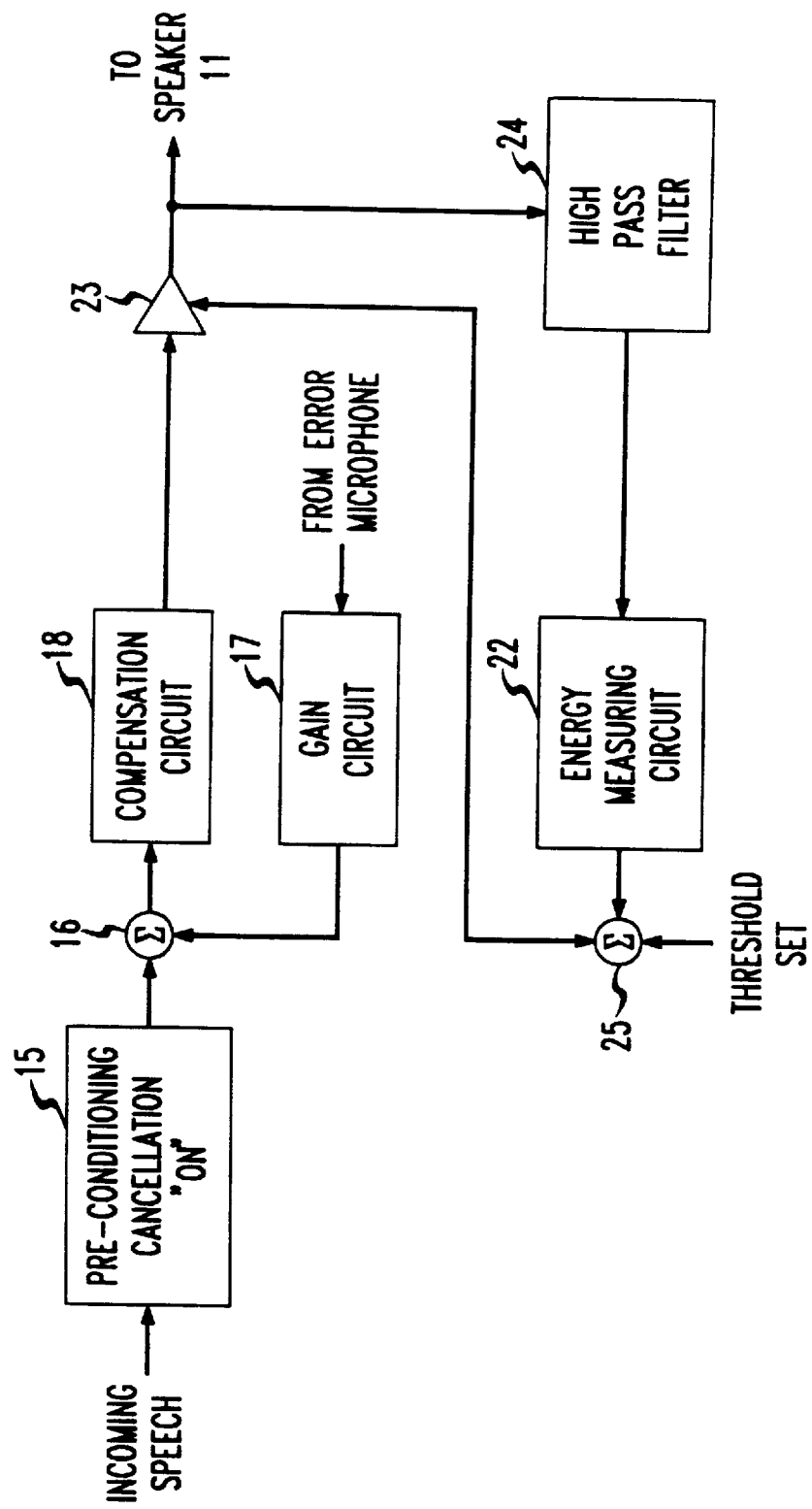
FIG. 15 is an oscillation prevention circuit block diagram.

Instabilities in a noise cancelling circuit used with a telephone handset, or that arise because of the wide range of different positions the earpiece might be placed in relation to the ear, are substantially reduced in accordance with another aspect of the invention. Some positions of the instrument on a user's ear will change overall feedback gain in the circuit of FIG. 1 and cause oscillations at frequencies where the phase produces positive feedback. An oscillation-prevention diagram is shown in FIG. 15 wherein functions performed and numerical callouts correspond to those of FIG. 1. Gain control 23 is fixed for purposes of providing normal noise cancellation. High-pass filter 24 passes energy of the speaker 11 input circuit at the frequencies where oscillation can occur. An energy measuring circuit 22 continuously measures the output of filter 24. Summer 25 compares this output to a preset threshold value for the particular receiver. When the detected energy exceeds the threshold, the gain control 23 located in the control feedback signal path to speaker 11 is reduced for a duration of about 1–2 seconds. Thereafter, the gain in gain control 23 is returned to its set value. The oscillation prevention circuit provides for fast reduction of the feedback loop gain during transient unstable conditions, and automatic restoration of the feedback loop gain when the condition passes. This circuit is useful in both noise cancelling headset and handset applications.

We claim:

1. In an ambient noise reducing telephone comprising a speaker-receiver, an incoming signal path to said receiver, an error microphone disposed at said receiver for picking up ambient noise signal at said receiver, and a noise-cancelling circuit responsive to error microphone output for generating an interfering acoustic signal which diminishes the amplitude of said noise signal, the improvement comprising:

(a) first and second incoming speech preconditioning circuits, said second preconditioning circuit disposed in the incoming signal path such that an incoming signal must traverse said second preconditioning circuit prior to said noise-cancelling circuit;

said first preconditioning circuit consisting of means for adjusting said incoming signal in frequency response in relation to the frequency response of said speaker-receiver so that the output of said speaker-receiver is essentially flat from about 500 Hz. to 3000 Hz. when said noise-cancelling circuit is inactive;

said second preconditioning circuit consisting of means for adjusting said incoming signal in frequency response in relation to the frequency response of the combination of said speaker-receiver and said noise-cancelling circuit so that the output of said speaker-receiver is essentially flat from about 500 Hz. to 3000 Hz. when said noise-cancelling circuit is active;

(b) switch means for selectively passing the output of either said first or said second preconditioning circuit to said speaker-receiver according to whether said noise-cancelling circuit is, respectively, inactive or active; and (c) an oscillation prevention circuit comprising:

high-pass filter means having input and output ports, said input being connected to the output of said second preconditioning circuit, for removing signals below about 1000 Hz.;

an energy-measuring circuit connected to said output port, for generating periodic measures of the energy level of signals in said output port; and variably settable threshold means for receiving an output of said energy-measuring circuit indicative of the onset of oscillations, and for sending a control signal to an output amplifier of the noise-cancelling circuit to reduce amplification by a predetermined amount for a preselected period, thereby to drive said output amplifier out of an oscillatory mode.

2. Apparatus in accordance with claim 1, wherein said speaker-receiver exhibits a phase response in the 1 to 2 KHz. region which approaches −180 degrees; and said noise-cancellation circuit comprises means for adding positive phase to the output of said cancellation circuit in an amount up to approximately 35 degrees, thereby to substantially extend the bandwidth of noise cancellation.

3. Apparatus in accordance with claim 2, wherein said compensation circuit further comprises:

means for adding high frequency roll-off to the output of said compensation circuit sufficient to effect a gain margin of about 10 dB in said speaker-receiver.

4. Apparatus in accordance with claim 1, wherein the periodicity of said energy measuring circuit is in the range essentially of from 0.1 to 2.0 seconds.

* * * * *